(No Model.)

G. H. DICKEY & W. DUSTER.
GLASS CARRIER.

No. 429,847. Patented June 10, 1890.

Witnesses
A. Ruppert
H. M. Latham

Inventor
Geo. H. Dickey
Wm. Duster
Per Thomas P. Simpson
Attorney

UNITED STATES PATENT OFFICE.

GEORGE H. DICKEY AND WILLIAM DUSTER, OF TARENTUM, PENNSYLVANIA.

GLASS-CARRIER.

SPECIFICATION forming part of Letters Patent No. 429,847, dated June 10, 1890.

Application filed January 7, 1890. Serial No. 336,163. (No model.)

*To all whom it may concern:*

Be it known that we, GEORGE H. DICKEY and WILLIAM DUSTER, citizens of the United States, residing at Tarentum, in the county of Allegheny and State of Pennsylvania, have invented certain new and useful Improvements in Glass-Carriers; and we do hereby declare the following to be a full, clear, and exact description of the invention, such as will enable others skilled in the art to which it appertains to make and use the same.

This invention relates to apparatus for carrying plate-glass; and it consists in certain improvements on the apparatus described in Letters Patent No. 417,237, issued to us December 17, 1889.

Figure 1:
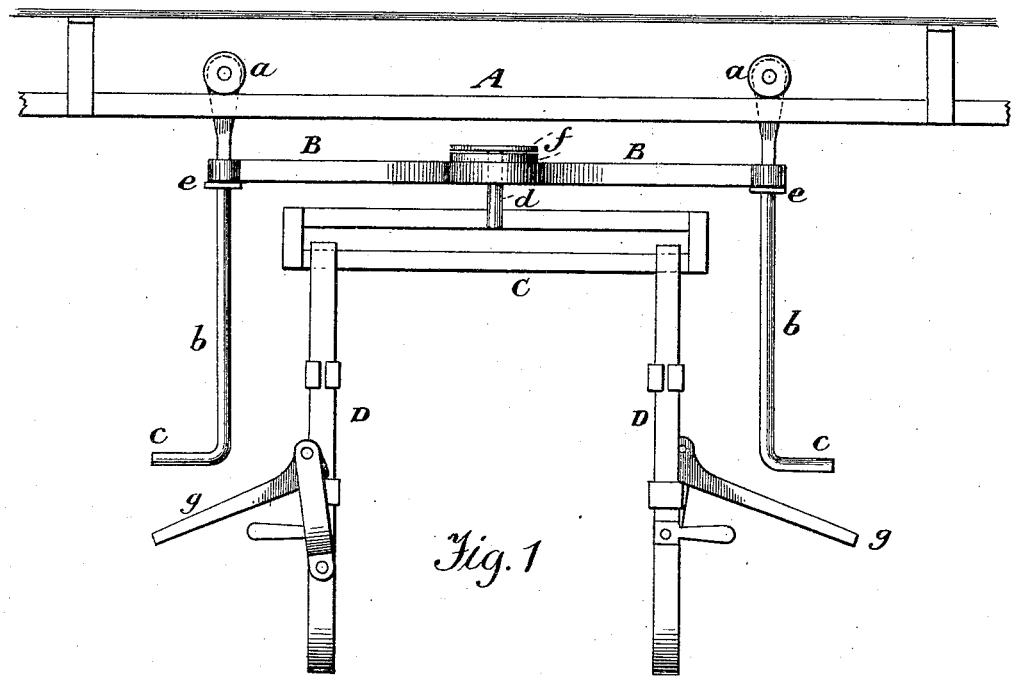
Figure 2:
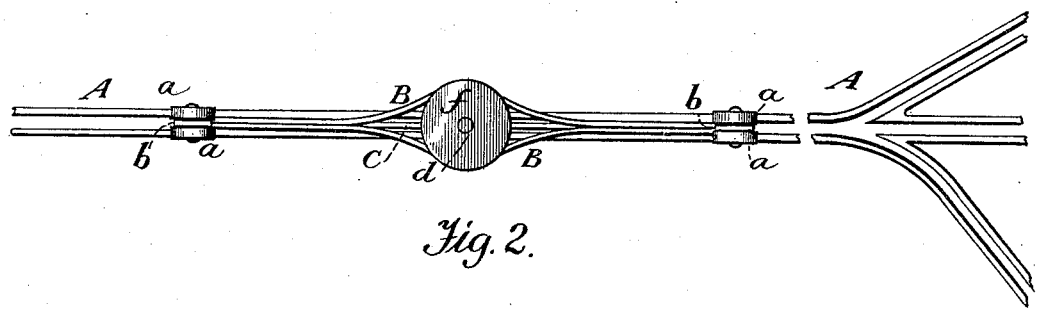

In the accompanying drawings, Figure 1 represents a side view of our improved glass-carrier connected with an elevated track. Fig. 2 is a plan view of certain parts.

A designates an elevated track, supported by hangers connected with the ceiling of a wareroom or shop, the said track having branches extending to different points. Two double or divided rollers $a$ are placed on said track, and from the axles of said rollers depend the rods $b$. Each of the rods $b$ is provided with a handle $c$ at its lower end, and is flattened at its upper end, which is secured between the two parts of a roller to its axle.

B indicates a horizontal bar, the extremities of which are loosely connected with the pendent rods $b$ and rest on shoulders $e$, formed on said rods. Below the bar B is a horizontal frame or slotted bar C, to which the glass-holders D are movably secured, so that they may be moved toward or from each other, as desired. The slotted bar C has a swivel or pivotal connection with the bar B by means of two plates or disks $f$, secured on the bar B, and a rod $d$, which is fastened to the upper disk, and, extending down through the lower disk, is fastened to said slotted bar.

The lower disk $f$ forms a bearing-surface for the upper disk, which is free to turn thereon when the bar C is turned on the pivotal connection thus formed. The glass-holders D, which are suspended from the bar C, are somewhat in the form of loops, constructed in parts and provided with pivoted levers $g$, by means of which they may be contracted or extended. The bar B being supported at both ends and connected with the track by the rods $b$ and rollers $a$, the carrier is held quite steadily in its movement. The rods $b$ may be readily turned with an axial movement by means of the handles $c$, for the purpose of turning the carrier to run it on a branch track, a rod $b$ being turned as the wheel or roller $a$, connected with it, reaches an angle in the track, and thus directing the roller onto the branch.

We claim—

1. In a glass-carrier, a horizontal bar and two vertical rods provided with rollers at their upper ends and loosely connected with said bar at its extremities, in combination with a lower horizontal bar and glass-holders connected therewith, and a rod made fast to said lower bar and provided with a swivel-connection with the first-mentioned bar, substantially as set forth and described.

2. The combination, with the horizontal bar B, of the shouldered rods $b$, rollers $a$, secured to the upper extremities of said rods, and slotted bar C, provided with a swivel-connection with the bar B, substantially as and for the purposes described.

In testimony whereof we have affixed our signatures in presence of two witnesses.

GEORGE H. DICKEY.
WILLIAM DUSTER.

Witnesses:
ROBERT BRASHEAR,
J. C. F. LARDIN.